United States Patent
Oooka (10) Patent No.: US 10,071,680 B2
(45) Date of Patent: Sep. 11, 2018

(54) EVACUATION TRAVELLING CONTROL DEVICE AND EVACUATION TRAVELLING CONTROL METHOD

(71) Applicant: DENSO CORPORATION, Kariya, Aichi-pref. (JP)

(72) Inventor: Masao Oooka, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 15/170,729

(22) Filed: Jun. 1, 2016

(65) Prior Publication Data
US 2016/0355123 A1 Dec. 8, 2016

(30) Foreign Application Priority Data

Jun. 2, 2015 (JP) ................... 2015-112210

(51) Int. Cl.
 *B60Q 1/52* (2006.01)
 *B60Q 1/46* (2006.01)
(52) U.S. Cl.
 CPC .......... *B60Q 1/52* (2013.01); *B60Q 1/46* (2013.01)
(58) Field of Classification Search
 CPC ..................... B60Q 1/52; B60Q 1/46
 See application file for complete search history.

(56) References Cited

U.S. PATENT DOCUMENTS

2015/0203126 A1* 7/2015 Kobana ............... B60W 50/12
 701/93

FOREIGN PATENT DOCUMENTS

| DE | 102012013602 | 4/2014 |
| JP | 2006-023862 A | 1/2006 |
| JP | 2009-163434 | 7/2009 |
| JP | 2014-044707 A | 3/2014 |
| JP | 5494182 B2 | 5/2014 |

* cited by examiner

*Primary Examiner* — Basil T Jos
(74) *Attorney, Agent, or Firm* — Knobbe, Martens, Olson & Bear, LLP (57) ABSTRACT

An evacuation travelling control device has an evacuation direction judgment section for detecting an evacuation direction of an own vehicle during an evacuation travelling mode of the own vehicle and a light switching pattern generation section for generating a light pattern which relates to one or more combinations of lit and unlit states of lamps including direction indicators mounted on the own vehicle when informing the evacuation direction of the own vehicle detected by the evacuation direction judgment section to drivers of other vehicles and pedestrians around the own vehicle.

16 Claims, 6 Drawing Sheets

SIDE VIEW OF VEHICLE

FRONT SIDE ⟵⟶ REAR SIDE

FIG.7B

SIDE VIEW OF VEHICLE

FRONT SIDE ⟵⟶ REAR SIDE

EVACUATION TRAVELLING CONTROL DEVICE AND EVACUATION TRAVELLING CONTROL METHOD

CROSS-REFERENCE TO RELATED APPLICATION

This application is related to and claims priority from Japanese Patent Application No. 2015-112210 filed on Jun. 2, 2015, the contents of which are hereby incorporated by reference.

BACKGROUND OF THE INVENTION

1. Field of the Invention

The present invention relates to evacuation travelling control devices and methods relating to emergency evacuation control technology capable of providing warning and emergency information to drivers of other vehicles, pedestrians, etc. around an own vehicle during an evacuation travelling mode when an emergency situation occurs in the own vehicle.

2. Description of the Related Art

In evacuation travelling control technology is widely known, the driver of an own vehicle turns on an emergency evacuation travelling switch when an emergency situation occurs in the own vehicle on a roadway such as a highway. That is, the evacuation travelling control switches a vehicle drive mode to an evacuation travelling mode when the driver of the own vehicle turns on the emergency evacuation travelling switch in order to move the own vehicle to a safe place, and provides an emergency warning to drivers of other vehicles and pedestrians around the own vehicle. In the evacuation travelling mode of the own vehicle, the vehicle speed is gradually reduced and the own vehicle is guided to a safe place such as a shoulder lane and a parking lane, etc. in order for the own vehicle to stop safety in the safe place, without causing a traffic accident.

For example, a patent document 1, Japanese patent No. JP 5494182, has disclosed a conventional evacuation travelling control capable of instructing the overall lamps including direction indicators mounted on an own vehicle to blink simultaneously in order to provide warning to drivers of other vehicles and pedestrians around the own vehicle.

When detecting an emergency situation, the conventional evacuation travelling control technology uses turn signal indicators mounted on a vehicle as hazard lamps during the evacuation travelling mode. This provides emergency warning information to the drivers of the other vehicles, pedestrians, etc. around the own vehicle. However, it is difficult for the conventional evacuation travelling control technology to provide the evacuation direction of the own vehicle to drivers of the other vehicles, and pedestrians.

The conventional evacuation travelling control technology uses the turn signal indicators to indicate the evacuation direction of the own vehicle during the evacuation travelling mode, and drivers of other vehicles and pedestrians around the own vehicle can recognize the evacuation direction of the own vehicle. However, this conventional technique cannot correctly provide occurrence of the emergency state of the own vehicle to drivers of the other vehicles and pedestrians around the own vehicle.

SUMMARY

It is therefore desired to provide an evacuation travelling control device and method capable of providing, to drivers of other vehicles and pedestrians around an own vehicle, visible evacuation information and warning relates to occurrence of abnormality and the emergency situation of the own vehicle and an evacuation direction of the own vehicle during an evacuation travelling mode by using various types of lamps, turn direction indicators and control devices mounted on the own vehicle without using additional components such as additional lamps including indicators.

An exemplary embodiment provides an evacuation travelling control device having an evacuation direction judgment section and a light switching pattern generation section. The evacuation direction judgment section judges an evacuation direction of an own vehicle during an evacuation travelling mode of the own vehicle.

The light switching pattern generation section generates light patterns relating to combinations of lit and unlit states of lamps including direction indicators mounted on the own vehicle when informing the evacuation direction of the own vehicle judged by the evacuation direction judgment section to drivers of other vehicles and pedestrians around the own vehicle.

The light switching pattern generation section in the evacuation travelling control device generates various light patterns relating to combinations of lit and unlit states of various types of lamps including direction indicators mounted on the own vehicle without using any additional lamps and direction indicators. Further, the light switching pattern generation section provides clearly visible information in a short period of time, where such visible information relates to occurrence of abnormality, the emergency situation of the own vehicle, a turn direction of the own vehicle, or a drive lane change of the own vehicle to drivers of other vehicles and pedestrians around the own vehicle. Accordingly, it is possible for the present invention to provide, to the drivers of the other vehicles and pedestrians around the own vehicle, visible evacuation information relating to the evacuation direction of the own vehicle during the evacuation travelling mode by using the various types of the lamps including turn direction indicators mounted on the own vehicle without requiring additional components.

In accordance with another aspect of the present invention, there is provided an evacuation travelling control method including an evacuation direction detection step and a light pattern step. The evacuation direction detection step detects an evacuation direction of an own vehicle during an evacuation travelling move of the own vehicle. The light pattern step generates a light pattern relating to a combination of lit and unlit states of lamps including direction indicators mounted on the own vehicle when informing the evacuation direction of the own vehicle detected by the evacuation direction detection step to drivers of other vehicles and pedestrians around the own vehicle. Therefore, it is possible for the evacuation travelling control method to have the same effects and functions provided by the evacuation travelling control device.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Hereinafter, various embodiments of the present invention will be described with reference to the accompanying drawings. In the following description of the various embodiments, like reference characters or numerals designate like or equivalent component parts throughout the several diagrams.

Exemplary Embodiment

Figure 1:
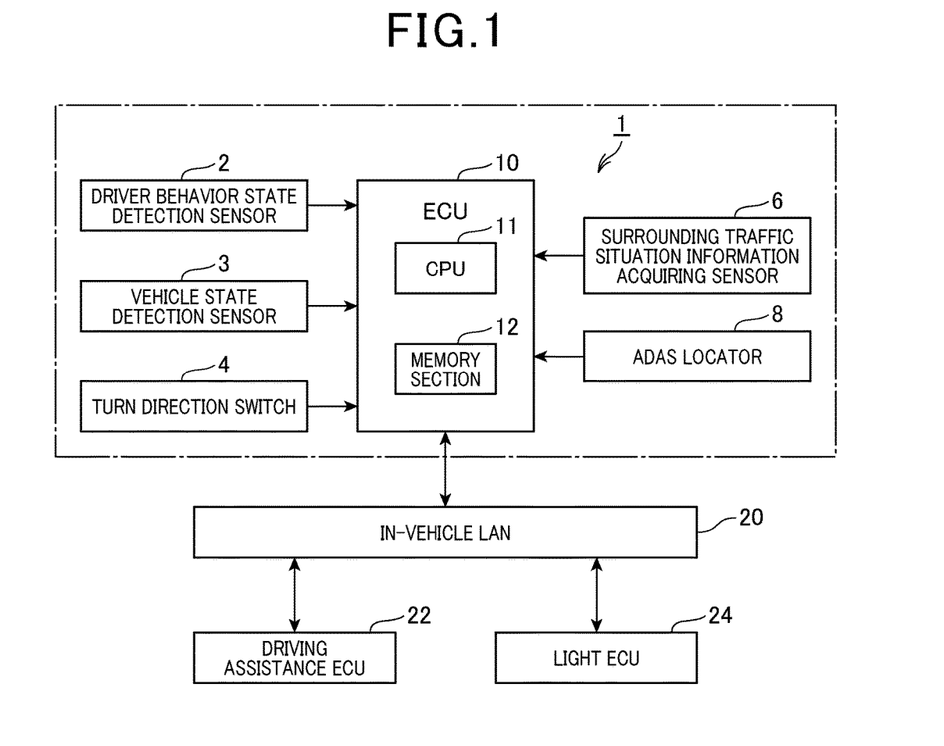
FIG. 1 is a view showing a block diagram of an evacuation travelling control device 1 according to an exemplary embodiment of the present invention.

A description will be given of an evacuation travelling control device and an evacuation travelling control method according to an exemplary embodiment with reference to FIG. 1 to FIG. 7A and FIG. 7B.
[Structure]
FIG. 1 is a view showing a block diagram of the evacuation travelling control device 1 according to the exemplary embodiment. The evacuation travelling control device 1 according to the exemplary embodiment shown in FIG. 1. The evacuation travelling control device 1 is connected to an in-vehicle local area network (in-vehicle LAN) 20. The evacuation travelling control device 1 has a driver behavior state detection sensor 2, a vehicle state detection sensor 3, a turn direction switch 4, a surrounding traffic situation information acquiring sensor 6, an Advanced Driver Assistance System (ADAS) locator 8, and an electronic control unit (ECU) 20. A driving assistance electronic control unit (driving assistance ECU) 22 and a lamp electronic control unit (lamp ECU) 24 are further connected to the in-vehicle LAN 20. The evacuation travelling control device 1 is mounted on the own vehicle.

The ECU 10 has a central processing unit (CPU) 11, a memory section 12 such as a read only memory (ROM) and a random access memory (RAM), etc., and an input and output interface, etc. The CPU 11 reads programs stored in the memory section 12 and executes the programs to realize or provide various functional sections.

Figure 2:
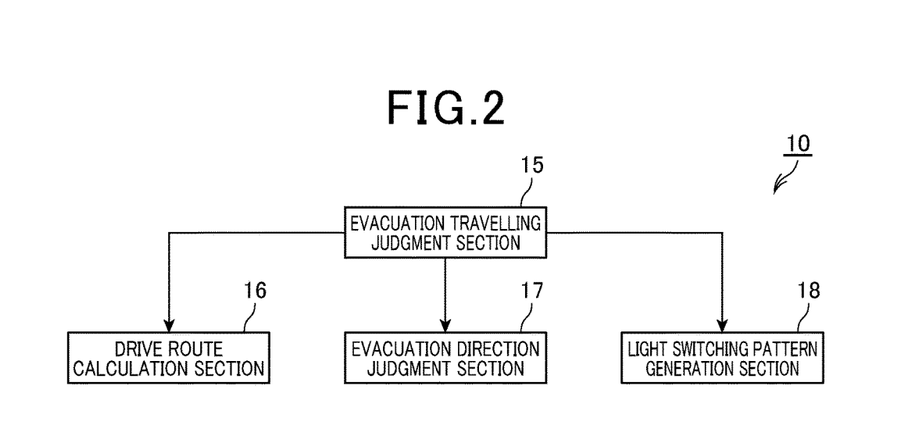
FIG. 2 is a view showing a block diagram of functional sections realized by an ECU 10 which forms the evacuation travelling control device 1 according to the exemplary embodiment of the present invention.

FIG. 2 is a view showing a block diagram of these functional sections realized by the ECU 10. The ECU 10 forms the evacuation travelling control device 1 according to the exemplary embodiment.

As shown in FIG. 2, the ECU 10 has an evacuation travelling judgment section 15, a drive route calculation section 16, an evacuation direction judgment section 17, a light switching pattern generation section 18.

The driver behavior state detection sensor 2 shown in FIG. 1 is composed of various types of sensors and switches capable of detecting the vehicle driver's behavior of the own vehicle on the basis of known methods, for example, a method of detecting a depressed consciousness level of the vehicle driver, a method of detecting behavior state of the vehicle driver on the basis of images captured by an in-vehicle camera, a method of detecting physical conditions of the vehicle driver, a method of detecting when the vehicle driver turns on an emergency switch, a method of detecting voice of the vehicle driver through a microphone as a speech recognition device, etc.

The depressed level of consciousness of the vehicle driver indicates various states where the vehicle driver feels very sleepy, sick, or loses consciousness, i.e. the consciousness of the vehicle driver is reduced to be less than a predetermined consciousness level. The various sensors and switches transmit detection information of the vehicle driver's condition to the evacuation travelling judgment section 15 every predetermined cycle.

The vehicle state detection sensor 3 is composed of various types of known sensors capable of detecting vehicle conditions on the basis of known methods. The driver behavior state detection sensor 2 includes various types of switches.

There are known various methods for detecting occurrence of abnormality of the own vehicle, for example, a method of detecting an air pressure of vehicle tires, a temperature of cooling water of an internal combustion engine, a method of detecting a concentration of specific gas in exhaust gas, an air fuel ratio (A/F ratio), a method of detecting vehicle's conditions on the basis of self-diagnosis functions by executing programs stored in various ECUs such as the driving assistance ECU 22, a method of directly detecting occurrence of abnormality of the own vehicle when the vehicle driver and fellow passengers turn off an emergency switch or through a voice recognition device or microphone, etc., or a method of combining the methods previously described. The vehicle state detection sensor 3 transmits the detected information previously described to the evacuation travelling judgment section 15 every predetermined cycle.

The surrounding traffic situation information acquiring sensor 6 is configured to receiving surrounding traffic situation information. Specifically, the surrounding traffic situation information acquiring sensor 6 is composed of an image sensor, a radar sensor, etc. capable of emitting millimeter waves and sound waves, etc., and acquiring surrounding images and information on the basis of the reflected millimeter waves and sound waves. The ECU 10 receives the acquired images and information transmitted form the sensor 6, and detects one or more target objects, a distance to an object, a relative speed between the own vehicle and the object, and a current location of the own vehicle on the basis of the received images and information. Further, the ECU 10 executes image processing on the basis of the received images and information, and extracts the target from the received images. The ECU 10 detects the number of drive lanes and a current drive lane on which the own vehicle runs.

The ADAS locator 8 is a position information acquiring unit which is used for advanced driver assistance systems. For example, the ADAS locator 8 receives satellite waves of global positioning system (GPS satellite waves) transmitted from GPS satellites, and detects a current location of the own vehicle on the basis of arriving time data of the received GPS satellite waves. Further, the ADAS locator 8 has a map data base including road map information which corresponds to latitude and longitude data. The road map information is a database having a table structure which includes link information and node information. Such links form one or more roads, and a node connects at least two links together. Because such link information contain a link length, a road width, connection nodes, curve information, etc., the ADAS locator 8 can detect a road shape on the basis of the road map information. Further, the map DB stores various road information such as types of roads such as highways and general roads, the number of drive lanes, and additional information. The additional information includes emergency evacuation places for vehicles, etc. such as a lane shoulder and a parking lane. The ADAS locator 8 detects the road shape and evacuation places in front of the own vehicle on the basis of the road information. The ADAS locator 8 transmits the received information and detected information to the drive route calculation section 16.

The turn direction switch 4 is a known switch. The vehicle driver turns on the turn direction switch 4 in order to provide turn direction information, toward the right or left direction, and switch the drive lane. When the vehicle driver turns on the turn direction switch 4, the switch turned-on information is transmitted to the evacuation direction judgment section 17.

The driving assistance ECU 22 is composed of one or plural ECUs capable of performing a driving assistance control of the own vehicle. The driving assistance ECU 22 transmits control instruction signals to a throttle actuator (throttle ACT), a brake actuator (brake ACT), a steering actuator (steering ACT), etc. For example, when receiving evacuation information (evacuation place, evacuation direction, etc.) transmitted from the drive route calculation section 16, the driving assistance ECU 22 extracts target travel route information from the received evacuation information, generates control instruction signals on the basis of the extracted target travel route information, and transmits the control instruction signals to the ACT including the steering ACT so that the own vehicle runs on the target travel route. The evacuation information will be explained in detail later. This makes it possible to switch the current drive lane of the own vehicle to the adjacent drive lane at a shoulder lane side on the roadway, or moves the own vehicle from the current drive lane into the shoulder lane or parking lane. When determining the timing to switch the drive lane of the own vehicle, the driving assistance ECU 22 transmits drive lane change timing information, which indicates the right direction or left direction, to the evacuation direction judgment section 17 through the in-vehicle LAN 20.

When receiving the evacuation information, the driving assistance ECU 22 transmits control signals to the ACTs including the throttle ACT and the brake ACT so that the own vehicle stops at the target stop position along the target travel route. This makes it possible to immediately guide the own vehicle to the safe area such as a shoulder lane, a parking lane, etc. When performing the drive lane change and the vehicle stop control, the driving assistance ECU 22 also performs the driving assistance control simultaneously so as to avoid occurrence of a traffic collision or scraping against another vehicle and obstacles detected by the surrounding traffic situation information acquiring sensor 6, for example.

The lamp ECU 24 performs the lamp control of plural types of lamps mounted on the own vehicle.

Figure 3:
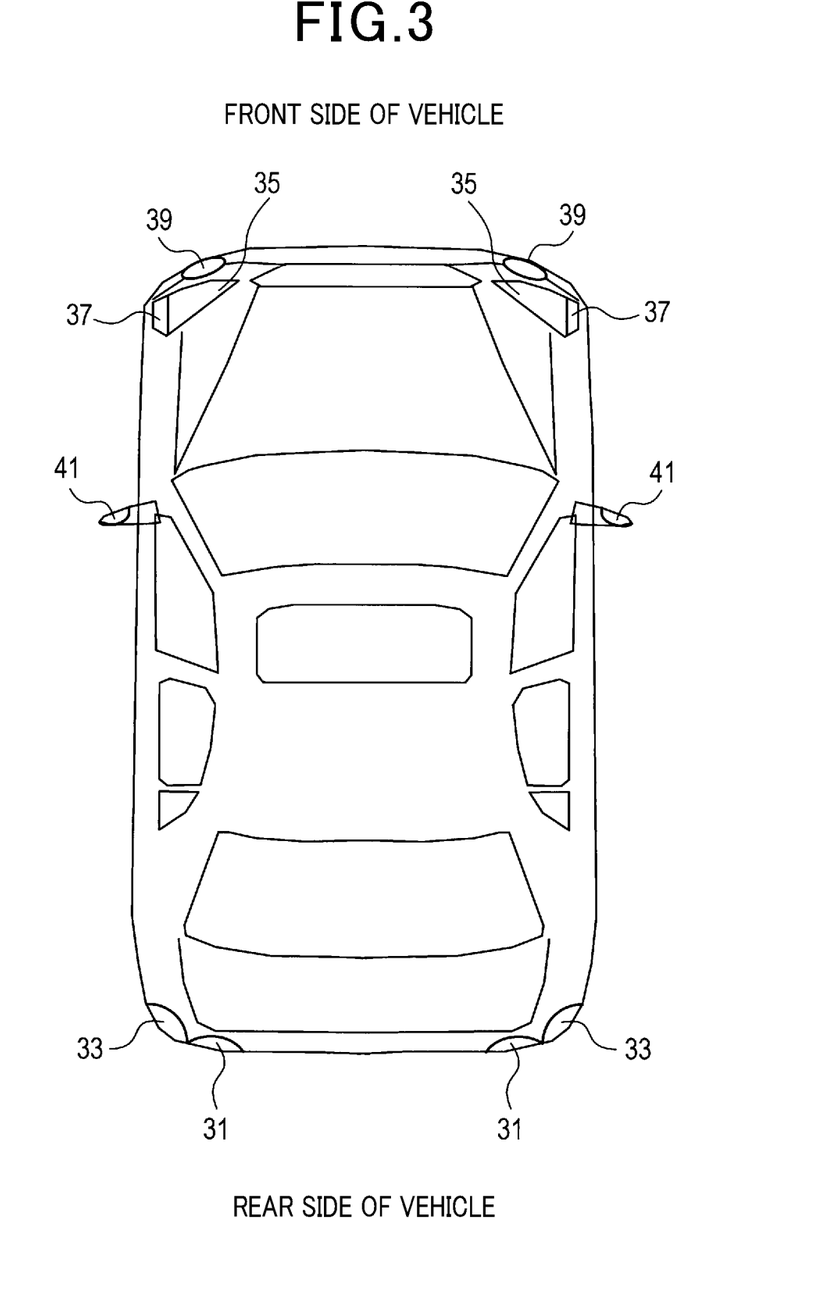
FIG. 3 is a top view of an own vehicle equipped with various types of lamps.
Figure 5A:
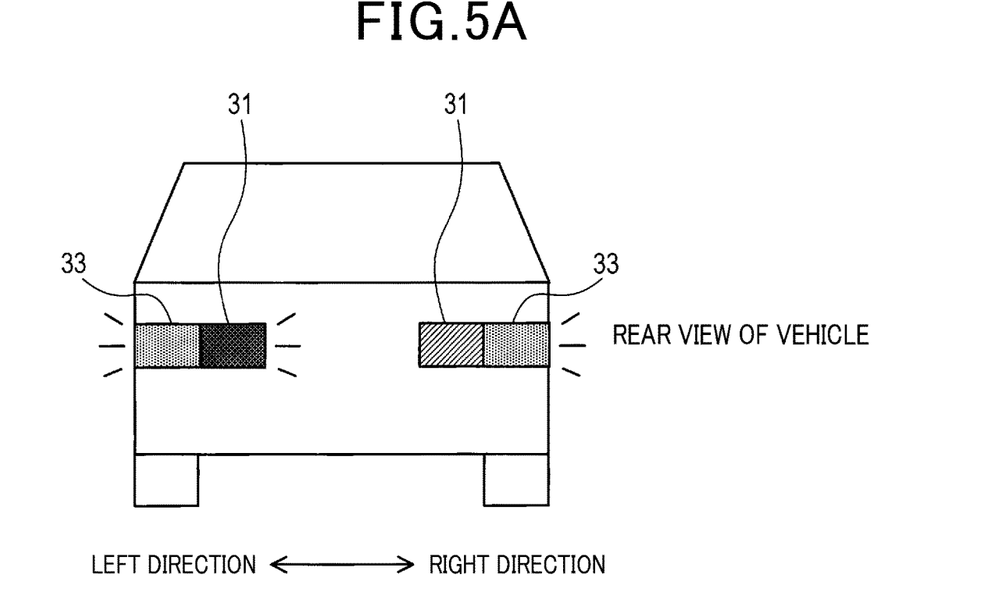
FIG. 5A is a rear view of the own vehicle for explaining a different light pattern of the own vehicle having tail lamps 31 and rear side direction indicators 33.
Figure 5B:
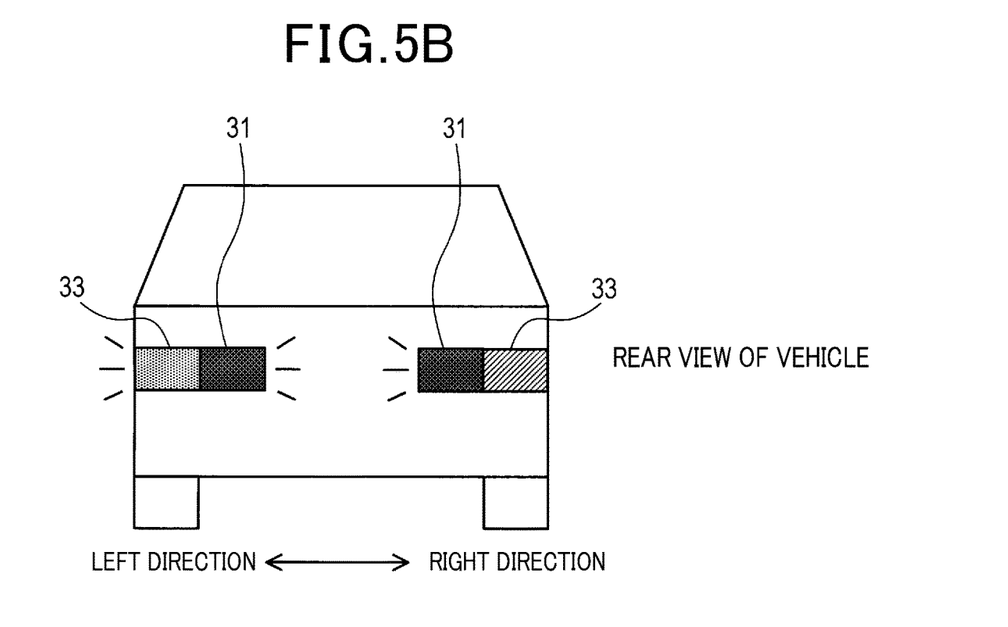
FIG. 5B is a rear view of the own vehicle for explaining a different light pattern of the own vehicle having tail lamps 31 and rear side direction indicators 33.

FIG. 3 is a top view of the own vehicle having various types of plural lamps. As shown in FIG. 3, the own vehicle has tail lamps 31, the rear side direction indicators 33, the head lamps 35, front side direction indicators 37, the fog lamps 39, the side direction indicators 41, etc. FIG. 5A and FIG. 5B are rear views of the own vehicle for explaining a different light pattern of the own vehicle having the tail lamps 31 and the rear side direction indicators 33.

That is, as shown in FIG. 5A and FIG. 5B, the tail lamps 31 make a pair arranged at the right side and left side of the own vehicle. The rear side direction indicators 33 make a pair arranged at the right side and left side of the own vehicle.

Figure 6A:
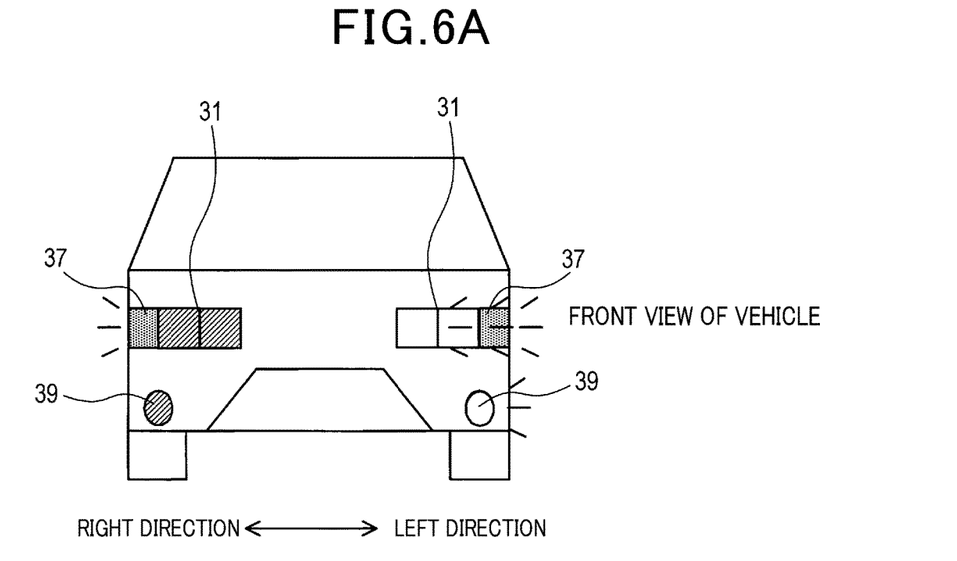
FIG. 6A is a front view of the own vehicle for explaining a different light pattern of head lamps 35, front side direction indicators 37 and fog lamps 39.
Figure 6B:
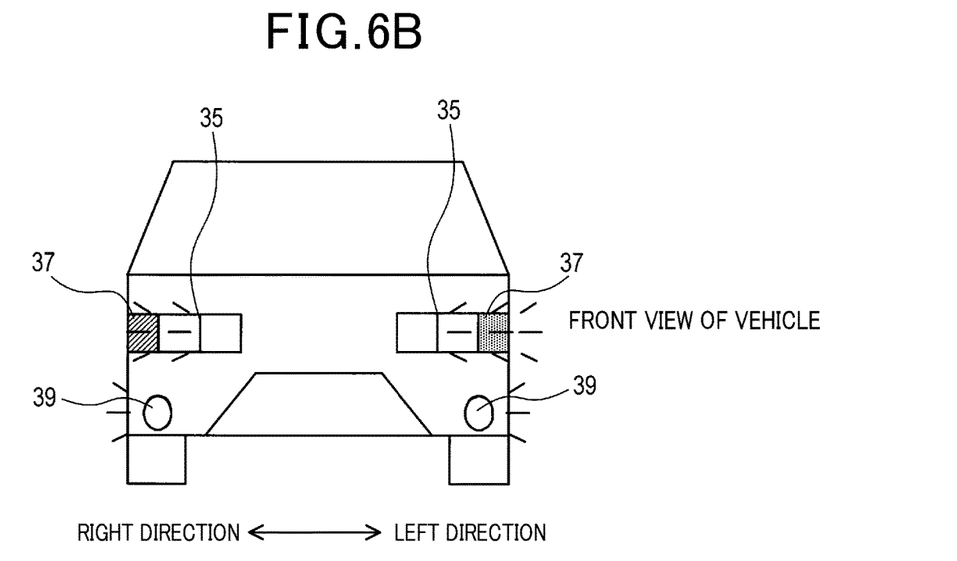
FIG. 6B is a front view of the own vehicle for explaining a different light pattern of head lamps 35, front side direction indicators 37 and fog lamps 39.

FIG. 6A and FIG. 6B are front views of the own vehicle for explaining a different light pattern of the head lamps 35, the front side direction indicators 37 and the fog lamps 39. As shown in FIG. 6A and FIG. 6B, the head lamps 35 make a pair arranged at the right side and left side of the own vehicle. The front side direction indicators 37 make a pair arranged at the right side and left side of the own vehicle. The fog lamps 39 make a pair arranged at the right side and left side of the own vehicle.

Figure 7A:
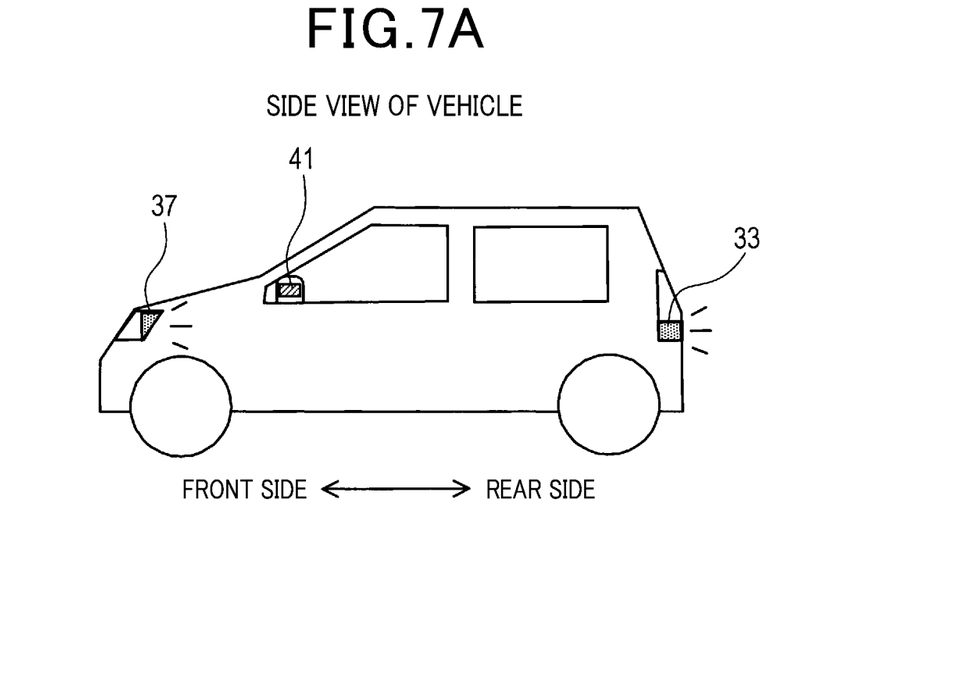
FIG. 7A is a side view of the own vehicle for explaining a different light pattern of the front side direction indicators 37, the rear side direction indicators 33 and side direction indicators 41.
Figure 7B:
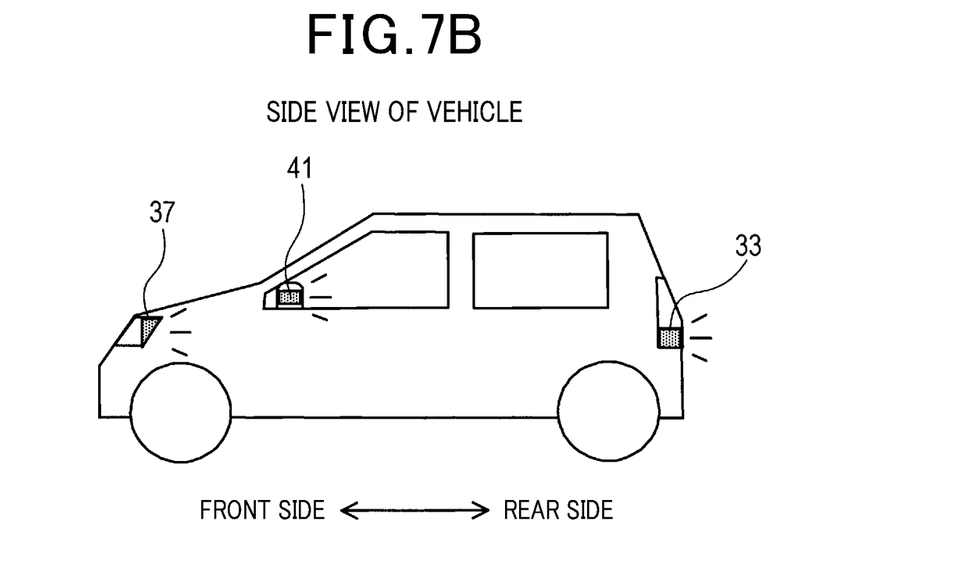
FIG. 7B is a side view of the own vehicle for explaining a different light pattern of the front side direction indicators 37, the rear side direction indicators 33 and side direction indicators 41.

FIG. 7A and FIG. 7B are side views of the own vehicle for explaining a different light pattern of the front side direction indicators 37, the rear side direction indicators 33 and side direction indicators 41. As shown in FIG. 7A and FIG. 7B, the side direction indicators 41 make a pair arranged at the right side and left side of the own vehicle.

The tail lamps 31 form a pair and are arranged at the right side and left side of the own vehicle, respectively. The tail lamps 31 are composed of known lamps to be used as tail lights, brake lights and reversing lights. Each of the tail lamps 31 is composed of one or more known lamp units, for example, a single lamp unit or plural lamp units.

The rear side direction indicators 33, the front side direction indicators 37 and the side direction indicators 41 are used as turn direction lamps and hazard lamps.

Each of the rear side direction indicators 33, the front side direction indicators 37 and the side direction indicators 41 is composed of one or more known lamp units, for example, a single lamp unit or plural lamp units.

The side direction indicators 41 are assembled with the right and left door mirrors, respectively. That is, the side direction indicators 41 are embedded in the inside of the side mirrors of the own vehicle, respectively.

The head lamps 35 are also arranged at the right side and left side of the own vehicle, respectively. Each of the head lamps 35 is composed of one or more known lamp units, for example, a single lamp unit or plural lamp units to be used as head lights and positioning lights.

The head lamps 35 are used as high beam lights and low beam lights (or high beam illumination and low beam illumination). The high beam light is used when the own vehicle runs on a drive lane at a high speed or runs without oncoming vehicles being present. On the other hand, the low beam light is used when the own vehicle runs at a low speed, or one or more oncoming vehicles are passing. Each of the fog lamps 39 is composed of one or more known light units, for example, a single light unit or plural light units used as a fog light.

When receiving the light pattern transmitted from the light switching pattern generation section 18, the lamp ECU 24 performs the light pattern control of these lamps. The light pattern relates to a combination of lit and unlit states and a blinking state of lamps including direction indicators, etc.

The evacuation travelling judgment section 15 in the ECU 10 shown in FIG. 2 switches the current drive mode, for example, from the normal drive mode to an evacuation travelling mode when judging that the consciousness level of the vehicle driver is not more than the predetermined consciousness level on the basis of the detection information transmitted from the driver behavior state detection sensor 2.

For example, the evacuation travelling judgment section 15 judges that the consciousness level of the vehicle driver is not more than the predetermined consciousness level when no movement of the vehicle driver is detected from the acquired image data transmitted from the in-vehicle cameras. Furthermore, the evacuation travelling judgment section 15 performs a weighted calculation of a time period to open the driver's eyes, a body temperature, a blood pressure, a heart rate, and a breathing rate of the vehicle driver to obtain the consciousness level of the vehicle driver. When the calculated consciousness level of the vehicle driver is not more than the predetermined consciousness level, the evacuation travelling judgment section 15 changes the current drive mode of the own vehicle to the evacuation travelling mode.

When it calculates the consciousness level of the vehicle driver on the basis of the detection information transmitted from the vehicle state detection sensor 3, and judges that the calculated consciousness level of the vehicle driver is not more than the predetermined consciousness level, the evacuation travelling judgment section 15 switches the drive mode of the own vehicle to the evacuation travelling mode from the normal drive modes. Further, when the driver of the own vehicle turns on the emergency switch, the evacuation travelling judgment section 15 switches the drive mode of the own vehicle to the evacuation travelling mode from the normal drive modes.

When the evacuation travelling judgment section 15 selects the evacuation travelling mode, the drive mode of the own vehicle is switched to the evacuation travelling mode from the normal drive modes, and each of the drive route calculation section 16, the evacuation direction judgment section 17 and the light switching pattern generation section 18 starts to operate.

The drive route calculation section 16 receives the drive lane information transmitted from the surrounding traffic situation information acquiring sensor 6 and the front road shape information transmitted from the ADAS locator 8. The drive route calculation section 16 corrects the front road shape information on the basis of the drive lane information. Further, the drive route calculation section 16 calculates a target travel route from the current location of the own vehicle to the evacuation place location on the basis of the corrected drive lane, the corrected current location of the own vehicle and the distance between the current location of the own vehicle and the evacuation place. A shape of each evacuation place is specified on the basis of the shape of a lane boundary line close to the road shoulder. The drive route calculation section 16 selects the farthest evacuation place measured from the current location of the own vehicle, and calculates, as the farthest evacuation distance, the distance to the farthest evacuation place along the target travel route calculated by the drive route calculation section 16.

The drive route calculation section 16 transmits target evacuation information such as the calculated distance to the evacuation place, the shape of the evacuation place, the target travel route, the farthest evacuation distance, etc. to the driving assistance ECU 22 through the in-vehicle LAN 20.

The evacuation direction judgment section 17 judges the evacuation direction of the own vehicle, to which the own vehicle moves, during the evacuation travelling mode of the own vehicle. Specifically, when receiving the drive direction change timing information transmitted from the driving assistance ECU 22, the evacuation direction judgment section 17 judges, as the evacuation direction, one of the right direction and the left direction of the own vehicle on the basis of the drive direction change timing information. For example, when receiving the turned-on information transmitted from the turn direction switch 4 after the engine starts, the evacuation direction judgment section 17 judges, as the evacuation direction, the turn right or left direction of the own vehicle and the changed drive direction of the own vehicle on the basis of the received turned-on information of the turn direction switch 4. The evacuation direction judgment section 17 transmits the evacuation direction information to the light switching pattern generation section 18.

The light switching pattern generation section 18 generates a light pattern indicating a combination of lit and unlit states and/or a blinking state of the plural lamps mounted on the own vehicle. The light pattern generated by the light switching pattern generation section 18 will be explained later.

[1-2. Process]

A description will now be given of the light pattern generation process performed by the light switching pattern generation section 18 with reference to FIG. 4.

Figure 4:
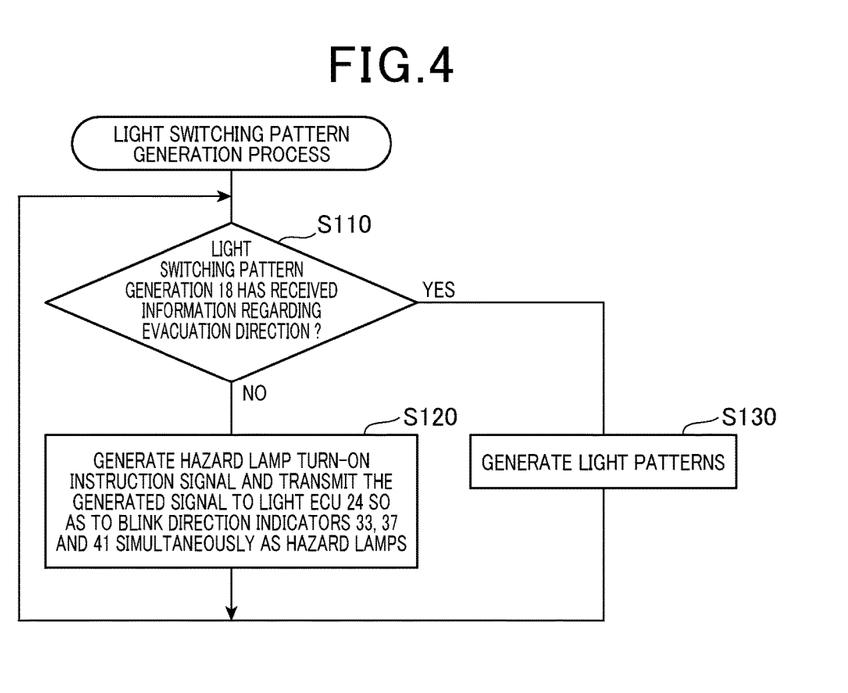
FIG. 4 is a view showing a flow chart of a light pattern generation process relating to a combination of lit and unlit states of lamps including direction indicators mounted on the own vehicle performed by the evacuation travelling control device and method according to the exemplary embodiment of the present invention.

FIG. 4 is a view showing a flow chart of a light pattern generation process of generating light patterns relating to combinations of lit and unlit states of lamps including direction indicators mounted on the own vehicle performed by the evacuation travelling control device and method according to the exemplary embodiment.

On starting the light pattern generation process starts, the light switching pattern generation section 18 detects whether or not the evacuation direction information is transmitted from the evacuation direction judgment section 17, and the light switching pattern generation section 18 has received the information regarding the evacuation direction during the evacuation travelling mode (step S110).

When the detection result indicates negation ("NO" in step S110), i.e. indicates that the light switching pattern generation section 18 has not receive the information regarding the evacuation direction, the operation flow progresses to step S120.

On the other hand, when the detection result indicates affirmation ("YES" in step S110), i.e. indicates that the light switching pattern generation section 18 has received the information regarding the evacuation direction transmitted from the evacuation direction judgment section 17, the operation flow progresses to step S130.

In step S120, because it is not necessary for the own vehicle to turn left or right, or change the drive lane thereof, the light switching pattern generation section 18 generates and transmits a hazard lamp turn-on instruction signal to the light ECU 24 through the in-vehicle LAN 20. The operation flow progresses to step S110.

When receiving the hazard lamp turn-on instruction signal transmitted from the light switching pattern generation section 18, the light ECU 24 performs the light control, i.e. instructs all of the indicators such as the rear side direction indicators 33, the front side direction indicators 37 and the side direction indicators 41 to be blinking, simultaneously. This makes it possible for the rear side direction indicators 33, the front side direction indicators 37 and the side direction indicators 41 to use as the hazard lamps.

Because the own vehicle turns to right or left, or changes its drive direction in step S130, the light switching pattern generation section 18 generates and transmits a light pattern to the light ECU 24 through the in-vehicle LAN 20. The generated light pattern is used to inform the turn direction to right or left, the change information of the evacuation direction as a drive direction of the own vehicle to other vehicles and pedestrians around the own vehicle. The operation flow progresses to step S110.

When receiving the generated light pattern, the light ECU 24 performs the light control, i.e. instructs, on the basis of a combination of turn on/off indicated by the received light pattern, all of the rear side direction indicators 33, the front side direction indicators 37 and the side direction indicators 41.

[1-3. Light Pattern]

A description will now be given of the light pattern of the rear side direction indicators 33, the front side direction indicators 37 and the side direction indicators 41. The light switching pattern generation section 18 generates this light pattern in step S130.

[1-3-1. Light Pattern for the Tail Lamps 31 and the Rear Side Direction Indicators 33]

A description will now be given of the light pattern of the tail lamps 31 and the rear side direction indicators 33 arranged at the rear side of the own vehicle.

The light switching pattern generation section 18 generates this light pattern in step S130. The light switching pattern generation section 18 generates the light pattern so as to turn on one lamp group, i.e. the tail lamps 31 or the rear side direction indicators 33 arranged at the rear side of the own vehicle, and turns on one of the other lamp group, which is arranged at the evacuation direction side, and turns off the remaining lamp in the other lamp group.

For example, as shown in FIG. 5A, the light switching pattern generation section 18 generates a first light pattern for turning on both the rear side direction indicators 33, and turning on the left side tail lamp 31, and turns off the right side tail lamp 31.

The tail lamps 31 can be used as tail lights, brake lights and reversing lights of the own vehicle. However, because the brake lights or the reversing lights provide high intensity beams to drivers of other vehicles and pedestrians around the own vehicle, this makes it possible to enhance the visibility to drivers of other vehicles and pedestrians around the own vehicle. In particular, when the tail lamps 31 are used as reversing lights and emit white color beams, which is higher in brightness than red color beams of the brake lights, this makes it possible to strongly call the attention of drivers of other vehicles and pedestrians around the own vehicle. As a result, drivers of other vehicles and pedestrians around the own vehicle can easily recognize the occurrence of abnormality of the own vehicle.

It is possible for the tail lamps 31 and the rear side direction indicators 33 to be turned on or blink continuously. When the tail lamps 31 are blinking, it is possible to strongly attract the attention of drivers of other vehicles and pedestrians around the own vehicle. As a result, drivers of other vehicles and pedestrians around the own vehicle can easily recognize the occurrence of abnormality of the own vehicle. In particular, when the tail lamps 31 and the rear side direction indicators 33 are turned on and off at a different timing, respectively, this makes it possible to strongly call the attention of drivers of other vehicles and pedestrians around the own vehicle, and drivers of other vehicles and pedestrians around the own vehicle can recognize the occurrence of abnormality of the own vehicle.

Still further, as shown in FIG. 5B, it is possible for the light switching pattern generation section 18 to generate a second light pattern for turning on the tail lamps 31 at both sides, i.e. the left side and the right side of the own vehicle, and further turn on one of the rear side direction indicators 33 simultaneously, which is arranged at the evacuation direction side. For example, the rear side direction indicator 33 at the left side is turned on, as shown in FIG. 5B.

Still further, it is possible for the light switching pattern generation section 18 to generate the first light pattern and the second light pattern alternately at predetermined time intervals.

[1-3-2. Light Pattern for the Head Lamps 35, the Front Side Direction Indicators 37 and the Fog Lamps 39]

A description will now be given of the light pattern for the head lamps 35, the front side direction indicators 37 and the fog lamps 39 arranged at the front side of the own vehicle. The light switching pattern generation section 18 generates this light pattern in step S130.

The light switching pattern generation section 18 generates the light pattern for turning on one lamp group, i.e. the head lamps 35 or the front side direction indicators 37, and turns on one of the other lamp group, which is arranged at the evacuation direction side, and turns off the remaining lamp in the other lamp group.

For example, as shown in FIG. 6A, the light switching pattern generation section 18 generates a third light pattern to turn on both the front side direction indicators 37 arranged at the left side and the right side of the own vehicle, and turn on one of the head lamp 35 simultaneously, which is arranged at the evacuation direction side of the own vehicle. For example, the head lamp 35 at the left side is turned on, as shown in FIG. 6A.

It is also possible to generate a modification of the third light pattern for turning on the head lamp 35 arranged at the left side and the fog lamp 39 arranged at the left side, i.e. arranged at the evacuation direction side of the own vehicle.

Each of the head lamps 35 acts as, i.e. is used as a high beam light and a low beam light (or high beam illumination and low beam illumination). Because the head lamps 35 provide high illumination and brightness when being used as high beam lights, this makes it possible to strongly attract attention and provide a warning to drivers of other vehicles and pedestrians around the own vehicle. In this case, it is possible to use the low beam light so that the driver of the own vehicle is safely visible during nighttime.

It is possible to use the head lamps 35 as high beam lights or low beam lights. When the head lamps 35 are used as high beam lights, it is possible to strongly attract attention and provide a warning to drivers of other vehicles and pedestrians around the own vehicle. In particular, when the light switching pattern generation section 18 may generate a light pattern to continuously turn on or blink some of the head lamps 35, the front side direction indicators 37 and the fog lamps 39 at a specific timing. When blinking these lamps and direction indicators at a different timing, this makes it possible to strongly attract the attention of drivers of other vehicles and pedestrians around the own vehicle. As a result, drivers of other vehicles and pedestrians around the own vehicle can correctly and easily recognize the occurrence of abnormality of the own vehicle, the evacuation direction and the turn left/right direction of the own vehicle.

Still further, it is possible for the light switching pattern generation section 18 to change the third light pattern according to change of surrounding traffic situation and environment around the own vehicle. For example, when an illuminance sensor, etc. detects nighttime, the light switching pattern generation section 18 generates a light pattern for blinking one of the high beam lamps emitting high beams, and continuously turn on both the low beam lamps arranged at the left and right sides of the own vehicle simultaneously. This control makes it possible to strongly attract the attention of drivers of other vehicles and pedestrians around the own vehicle.

Still further, as shown in FIG. 6B, it is acceptable for the light switching pattern generation section 18 to generate a fourth light pattern so as to turn on both the head lamps 35 arranged at the left and right sides of the own vehicle, and turn on one of the front side direction indicators 37 corresponding to the evacuation direction side of the own vehicle (for example, the front side direction indicator 37 at the right side of the own vehicle shown in FIG. 6B). Further, it is possible for the light switching pattern generation section 18 to modify the fourth light pattern so as to turn on the head lamps 35 and the fog lamps 39 arranged at the left and right sides of the own vehicle, simultaneously. Still further, it is possible for the light switching pattern generation section 18 to generate the third light pattern and the fourth light pattern alternately every predetermined period.

[1-3-3. Light Pattern for the Rear Side Direction Indicators 33, the Front Side Direction Indicators 37 and the Side Direction Indicators 41]

A description will now be given of the light pattern for the rear side direction indicators 33, the front side direction indicators 37 and the side direction indicators 41 arranged at the side of the own vehicle.

The light switching pattern generation section 18 generates this light pattern in step S130. That is, the light switching pattern generation section 18 generates the light pattern to select one group from the rear side direction indicators 33, the front side direction indicators 37 and the side direction indicators 41, and to turn on the lamp in the selected lamps at the evacuation direction side of the own vehicle.

For example, as shown in FIG. 7A, the light switching pattern generation section 18 generates a fifth light pattern for turning on one lamp in the rear side direction indicators 33 and one lamp in the front side direction indicators 37 arranged at the evacuation direction side of the own vehicle (for example, the rear side direction indicator 33 and the front side direction indicator 37 at the left side of the own vehicle shown in FIG. 7A and FIG. 7B), and to blink one of the side direction indicators 41 arranged at the evacuation direction side (for example, the side direction indicator 41 at the left side shown in FIG. 7B) of the own vehicle.

Further, as shown in FIG. 7B, it is possible for the light switching pattern generation section 18 to generate another light pattern for turning on one of the head lamps 35, one of the front side direction indicators 37, one of the rear side direction indicators 33 and one of the side direction indicators 41, which are arranged at the evacuation direction side of the own vehicle, simultaneously, (for example, the lamps at the left side of the own vehicle shown in FIG. 7B). In this light pattern, it is preferable to blink some of the front side direction indicator 37, the rear side direction indicator 33 and the side direction indicator 41, and to continuously turn on the remaining lamps.

Still further, for example, it is possible to blink all of the front side direction indicators 37, the rear side direction indicators 33 and the side direction indicators 41. In this light pattern, it is preferable to blink them at a different timing.

[1-4. Effects]

A description will now be given of effects of the evacuation travelling control device and the evacuation travelling control method according to the exemplary embodiment.

(1a) Because the evacuation travelling control device and method according to the exemplary embodiment generate specific light patterns for turning on, turning off and blinking these plural types of lamps including the direction indicators mounted on the own vehicle, it is possible to clearly and correctly provide visible information relating to occurrence of abnormality, the emergency situation of the own vehicle, the turn direction of the own vehicle, etc. to drivers of other vehicles and pedestrians around the own vehicle. It is therefore possible to clearly and correctly provide visible information and a warning to drivers of other vehicles and pedestrians around the own vehicle within a short period of time. The drivers of these vehicles and pedestrians around the own vehicle can receive and correctly recognize the visible information and a warning relating to occurrence of abnormality, the emergency situation of the own vehicle, and the turn left/right directions and drive lane change of the own vehicle, etc. This makes it possible to correctly provide visible information and a warning to drivers of other vehicles and pedestrians around the own vehicle, without using any additional components, during the evacuation travelling mode of the own vehicle.

(2a) Because the light pattern generated by the light switching pattern generation section 18 instructs to turn on one group of the tail lamps 31 and the rear side direction indicators 33, and turn on the lamp in the other group arranged at the evacuation direction side of the own vehicle, this makes it possible to effectively provide visible information relating to occurrence of abnormality, the emergency situation of the own vehicle, the turn left/right direction of the own vehicle and the drive lane change of the own vehicle to the drivers of following vehicles running behind the own vehicle. It is therefore possible for the drivers of following vehicles running behind the own vehicle to easily receive and correctly recognize the visible information and a warning relating to occurrence of abnormality, the emergency situation of the own vehicle, the turn left/right directions of the own vehicle and the drive lane change of the own vehicle during the evacuation travelling mode of the own vehicle.

(3a) Because the light pattern generated by the light switching pattern generation section 18 instructs to turn on the rear side direction indicators 33, and one of the tail lamps 31 arranged at the evacuation direction side of the own vehicle while using hazard lamp function, it is possible to provide visible information relating to occurrence of abnormality, the emergency situation of the own vehicle to drivers of following vehicles which are running behind the own vehicle, during the evacuation travelling mode of the own vehicle.

(4a) Because the light pattern generated by the light switching pattern generation section 18 instructs to turn on one group of the head lamps 35 and the front side direction indicators 37, and the lamp in the other group arranged at the evacuation direction side of the own vehicle, this makes it possible to effectively provide visible information and a warning relating to occurrence of abnormality, the emergency situation of the own vehicle, and the turn left/right directions of the own vehicle, and the drive lane change of the own vehicle to drivers of other vehicles, pedestrians, etc. in front of the own vehicle during the evacuation travelling mode of the own vehicle.

(5a) Because the light pattern generated by the light switching pattern generation section 18 instructs to turn on the front side direction indicators 37, and one of the head lamps 35 arranged at the evacuation direction side of the own vehicle while using the functions of hazard lamps, it is possible to correctly provide visible information and a warning relating to occurrence of abnormality, the emergency situation of the own vehicle to drivers of other vehicles, pedestrians, etc. in front of the own vehicle during the evacuation travelling mode of the own vehicle.

(6a) Because the light pattern generated by the light switching pattern generation section 18 instructs to turn on the fog lamps 39 and one of the head lamps 35 and the front side direction indicators 37, it is possible to clearly express and correctly provide visible information and a warning relating to occurrence of abnormality, the emergency situation of the own vehicle during the evacuation travelling mode of the own vehicle to drivers of other vehicles and pedestrians around the own vehicle.

(7a) Because the light pattern generated by the light switching pattern generation section 18 instructs to turn on one of the fog lamps 39 arranged at the evacuation direction side of the own vehicle, and the other of the head lamps 35 and the front side direction indicators 37, it is possible to clearly express and correctly provide visible information and a warning relating to the turn left/right directions of the own vehicle and the travel lane change of the own vehicle during the evacuation travelling mode to drivers of other vehicles and pedestrians around the own vehicle.

(8a) Because the light switching pattern generation section 18 generates the light pattern for turning on and off the front side direction indicators 37, the rear side direction indicators 33 and the side direction indicators 41 of the own vehicle, it is possible to correctly perceive visible information and a warning to drivers of other vehicles and pedestrians around the own vehicle, in more detail, the drivers of vehicles running in front of the own vehicle, the drivers of following vehicles running behind the own vehicle, and the drivers of vehicles running at one or both sides of the own vehicle during the evacuation travelling mode of the own vehicle.

(9a) Because the light switching pattern generation section 18 generates the light pattern for turning off one lamp, arranged at the evacuation direction side of the own vehicle, in one group selected from the front side direction indicators 37, the rear side direction indicators 33 and the side direction indicators 41, it is possible for these lamps and direction indicators to have different functions as hazard light and turn on/off lights. This makes it possible to clearly express and correctly provide visual information and a warning relating to the evacuation direction of the own vehicle to the drivers of vehicles, pedestrians, etc. around the own vehicle during the evacuation travelling mode of the own vehicle.

(10a) Because the light pattern generated by the light switching pattern generation section 18 instructs to turn on some of the lamps mounted on the own vehicle at a predetermine timing, and turns on the remaining lamps at a different timing, it is possible for drivers of other vehicles and pedestrians around the own vehicle to clearly and correctly perceive visual information relating to the drive states of the own vehicle such as the evacuation direction, the turn left/right directions, and occurrence of abnormality of the own vehicle.

[2. Various Modifications]

The concept of the present invention is not limited by the exemplary embodiment previously described. It is possible to modify the evacuation travelling control device and method according to the exemplary embodiment previously described as follows.

(2A) In the evacuation travelling control device according to the exemplary embodiment, the evacuation direction judgment section 17 judges the evacuation direction of the own vehicle to a safe place on the basis of the drive lane change timing information transmitted from the driving assistance ECU 22 and the switch turned-on information transmitted from the turn direction switch 4. However, the concept of the present invention is not limited by this. For example, it is possible for the evacuation direction judgment section 17 to judges the evacuation direction of the own vehicle on the basis of a predetermined one of the drive lane change timing information and the switch turned-on information, or on the basis of yaw rate information detected by and transmitted from a yaw rate sensor.

(2B) In the evacuation travelling control device 1 according to the exemplary embodiment previously described, the evacuation travelling judgment section 15 judges whether or not the evacuation travelling is required for the own vehicle on the basis of the detection results transmitted from the driver behavior state detection sensor 2 or the evacuation travelling judgment section 15. However, the concept of the present invention is not limited by this. For example, it is possible for the evacuation travelling judgment section 15 to judge whether or not the evacuation travelling is necessary for the own vehicle on the basis of the detection results transmitted from a predetermined one selected from the driver behavior state detection sensor 2 and the evacuation travelling judgment section 15, or to judge whether or not the evacuation travelling is necessary for the own vehicle on the basis of the emergency switch only.

(2C) It is acceptable to use a combination of the components used in the exemplary embodiment and/or known components and methods in order to realize the functions of the evacuation travelling control device 1 and method according to the exemplary embodiment previously described.

(2D) It is possible to realize the functions of the evacuation travelling control device 1 and method according to the exemplary embodiment and a system equipped with the evacuation travelling control device 1 by using one or more computer readable programs, or one or more media storing these programs.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. An evacuation travelling control device mounted on an own vehicle, comprising a computer system including a central processing unit, the computer system being configured to provide:
   an evacuation direction judgment section which detects an evacuation direction of the own vehicle during an evacuation travelling mode of the own vehicle; and
   a light switching pattern generation section
   which generates light patterns by turning on and off lamps mounted on the own vehicle, including direction indicators, on the basis of the detected evacuation direction of the own vehicle obtained by the evacuation direction judgment section to inform warning relating to pedestrians and drivers of other vehicles around the own vehicle,
   the light patterns generated by independently turning on and off the lamps mounted on the own vehicle.

2. The evacuation travelling control device according to claim 1, wherein the direction indicators comprises front side direction indicators and rear side direction indicators,
   the light switching pattern generation section generates the light pattern to turn on one group selected from a group of tail lamps and a group of the rear side direction indicators, and to turn on one of the other group which corresponds to the detected evacuation direction of the own vehicle,
   the tail lamps are arranged at a rear left hand side and a rear right hand side of the own vehicle, and the rear side direction indicators are arranged at a rear left hand side and a rear right hand side of the own vehicle.

3. The evacuation travelling control device according to claim 2, wherein the light switching pattern generation section generates a light pattern to turn on the rear side direction indicators arranged at the rear left hand side and the rear right hand side of the own vehicle, and one of the tail lamps, which corresponds to the detected evacuation direction of the own vehicle.

4. The evacuation travelling control device according to claim 2, wherein the light switching pattern generation section generates the light pattern so as to turn on one group selected from a group of head lamps and a group of front side direction indicators, and turn on one in the other group,
   the head lamps are arranged at a front left hand side and a front right hand side of the own vehicle, and the front side direction indicators are arranged at the front left hand side and the front right hand side of the own vehicle.

5. The evacuation travelling control device according to claim 4, wherein the light switching pattern generation section generates the light pattern so as to turn on the front side direction indicators and one of the head lamps which corresponds to the detected evacuation direction of the own vehicle.

6. The evacuation travelling control device according to claim 4, wherein the light switching pattern generation section generates one of a first light pattern and a second light pattern, where
   in the first light pattern, one group selected from a group of the head lamps and a group of the front side direction indicators is turned on, and fog lamps arranged at the front left hand side and the front right hand side of the own vehicle are turned on, and
   in the second light pattern, the other group selected from the group of the head lamps and the group of the front side direction indicators is turned on and one of the fog lamps which corresponds to the detected evacuation direction of the own vehicle is turned on.

7. The evacuation travelling control device according to claim 2, wherein the direction indicators comprises front side direction indicators and rear side direction indicators, and
   the light switching pattern generation section generates a light pattern to turn on and off the front side direction indicators, the rear side direction indicators, and the side direction indicators arranged at the left hand side and the right hand side of the own vehicle.

8. The evacuation travelling control device according to claim 7, wherein the light switching pattern generation section generates a light pattern to turn off one, which corresponds to the detected evacuation direction of the own vehicle, in one group selected from a group of the front side direction indicators, a group of the rear side direction indicators, and a group of the side direction indicators.

9. The evacuation travelling control device according to claim 2, wherein the lamp comprises head lamps, tail lamps, front side direction indicators, rear side direction indicators, and fog lamps, and
   the light switching pattern generation section generates the light pattern to blink some of the lamps at a blinking timing which is different from a lighting timing of the remaining lamps.

10. The evacuation travelling control device according to claim 1, wherein the light switching pattern generation section generates the light pattern so as to turn on one group selected from a group of head lamps and a group of front side direction indicators, and turn on one in the other group,
    the head lamps are arranged at a front left hand side and a front right hand side of the own vehicle, and the front side direction indicators are arranged at the front left hand side and the front right hand side of the own vehicle.

11. The evacuation travelling control device according to claim 10, wherein the light switching pattern generation section generates the light pattern so as to turn on the front side direction indicators and one of the head lamps which corresponds to the detected evacuation direction of the own vehicle.

12. The evacuation travelling control device according to claim 10, wherein the light switching pattern generation section generates one of a first light pattern and a second light pattern, where
    in the first light pattern, one group selected from a group of the head lamps and a group of the front side direction indicators is turned on, and fog lamps arranged at the front left hand side and the front right hand side of the own vehicle are turned on, and
    in the second light pattern, the other group selected from the group of the head lamps and the group of the front side direction indicators is turned on and one of the fog lamps which corresponds to the detected evacuation direction of the own vehicle is turned on.

13. The evacuation travelling control device according to claim 1, wherein the direction indicators comprises front side direction indicators and rear side direction indicators, and
    the light switching pattern generation section generates a light pattern to turn on and off the front side direction indicators, the rear side direction indicators, and the side direction indicators arranged at the left hand side and the right hand side of the own vehicle.

14. The evacuation travelling control device according to claim 13, wherein the light switching pattern generation section generates a light pattern to turn off one, which corresponds to the detected evacuation direction of the own vehicle, in one group selected from a group of the front side direction indicators, a group of the rear side direction indicators, and a group of the side direction indicators.

15. The evacuation travelling control device according to claim 1, wherein the lamp comprises head lamps, tail lamps, front side direction indicators, rear side direction indicators, and fog lamps, and the light switching pattern generation section generates the light pattern to blink some of the lamps at a blinking timing which is different from a lighting timing of the remaining lamps.

16. An evacuation travelling control method, comprising steps of:

detecting an evacuation direction of an own vehicle during an evacuation travelling mode of the own vehicle; and generating light patterns by turning on and off lamps mounted on the own vehicle including direction indicators, on the basis of the detected evacuation direction of the own vehicle to inform warning relating to pedestrians and drivers of other vehicles around the own vehicle, the light patterns generated by independently turning on and off the lamps mounted on the own vehicle.

\* \* \* \* \*